(12) United States Patent
Kim

(10) Patent No.: US 9,059,612 B2
(45) Date of Patent: Jun. 16, 2015

(54) SPINDLE MOTOR

(71) Applicant: SAMSUNG ELECTRO-MECHANICS CO., LTD., Suwon (KR)

(72) Inventor: Ju Ho Kim, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 298 days.

(21) Appl. No.: 13/709,759

(22) Filed: Dec. 10, 2012

(65) Prior Publication Data

US 2013/0193792 A1  Aug. 1, 2013

(30) Foreign Application Priority Data

Jan. 31, 2012  (KR) .................. 10-2012-0009541

(51) Int. Cl.
*F16C 32/06* (2006.01)
*H02K 5/15* (2006.01)
*H02K 5/16* (2006.01)
*H02K 5/167* (2006.01)
*G11B 19/20* (2006.01)
*F16C 17/04* (2006.01)
*F16C 33/10* (2006.01)
*F16C 33/12* (2006.01)
*F16C 17/10* (2006.01)

(52) U.S. Cl.
CPC .................. *H02K 5/15* (2013.01); *H02K 5/165* (2013.01); *H02K 5/1675* (2013.01); *G11B 19/2036* (2013.01); *F16C 2370/12* (2013.01); *F16C 17/045* (2013.01); *F16C 17/107* (2013.01); *F16C 33/1085* (2013.01); *F16C 33/128* (2013.01); *H02K 2205/03* (2013.01)

(58) Field of Classification Search
CPC .... F16C 17/026; F16C 17/045; F16C 17/107; F16C 33/128; F16C 33/145; F16C 33/1085; F16C 33/1055; F16C 2370/12; H02K 5/15; H02K 5/165; H02K 5/1675; H02K 2205/03
USPC ......... 384/100, 105, 107, 112, 120–121, 123, 384/279, 902; 310/90
See application file for complete search history.

(56) References Cited

U.S. PATENT DOCUMENTS

| | | | | |
|---|---|---|---|---|
| 5,957,589 A | * | 9/1999 | Lee et al. | 384/112 |
| 6,250,808 B1 | * | 6/2001 | Ichiyama | 384/107 |
| 6,619,847 B1 | * | 9/2003 | Ishikawa et al. | 384/100 |
| 7,241,051 B2 | * | 7/2007 | Grantz et al. | 384/119 |
| 7,284,910 B2 | * | 10/2007 | Dittmer et al. | 384/119 |

(Continued)

FOREIGN PATENT DOCUMENTS

| | | | | |
|---|---|---|---|---|
| JP | 07095743 A | * | 4/1995 | F16C 17/02 |
| JP | 2004-84864 | | 3/2004 | |
| JP | 2008-64302 | | 3/2008 | |

*Primary Examiner* — Marcus Charles

(57) ABSTRACT

A spindle motor includes a sleeve fixedly installed on a base member; a shaft rotatably supported by the sleeve; a rotor hub fixedly installed on an upper end portion of the shaft to rotate together therewith; and a thrust plate fixedly coupled to the sleeve so as to be disposed to face a lower surface of the rotor hub and having a ring shape. The thrust plate includes a channel part formed therein in order to reduce a difference in pressure between a bearing clearance on an inner side thereof and a bearing clearance on an outer side thereof. The channel part is configured of grooves formed in a lower surface of the thrust plate and an inner peripheral surface thereof.

5 Claims, 4 Drawing Sheets

(56) References Cited

U.S. PATENT DOCUMENTS

| | | | |
|---|---|---|---|
| 8,013,487 B2 * | 9/2011 | Hirata et al. | 360/99.08 |
| 2006/0126979 A1 * | 6/2006 | Uenosono et al. | 384/100 |
| 2008/0036302 A1 * | 2/2008 | Kim et al. | 310/90 |
| 2008/0095480 A1 * | 4/2008 | Obara et al. | 384/112 |
| 2010/0187927 A1 * | 7/2010 | Oh et al. | 310/90 |

\* cited by examiner

SPINDLE MOTOR

CROSS-REFERENCE TO RELATED APPLICATIONS

This application claims the priority of Korean Patent Application No. 10-2012-0009541 filed on Jan. 31, 2012, in the Korean Intellectual Property Office, the disclosure of which is incorporated herein by reference.

BACKGROUND OF THE INVENTION

1. Field of the Invention

The present invention relates to a spindle motor.

2. Description of the Related Art

In general, a small spindle motor used in a hard disk drive (HDD) is generally provided with a fluid dynamic bearing assembly, and lubricating fluid such as oil is provided in a bearing clearance formed between a shaft and a sleeve of the fluid dynamic bearing assembly. Fluid dynamic pressure is generated in the oil provided in the bearing clearance while being compressed, thereby rotatably supporting the shaft.

That is, the fluid dynamic bearing assembly generally generates dynamic pressure through thrust dynamic pressure grooves in an axial direction and radial dynamic pressure grooves in a circumferential direction, thereby promoting stability of rotational driving of the spindle motor.

Meanwhile, in accordance with the recent increase in capacity of the hard disk drive, a technical problem in which vibrations generated during driving of the spindle motor should be reduced has arisen. That is, in order to allow the hard disk drive to be driven without an error due to vibrations generated therein during the driving thereof, demand for an improvement in the performance of the fluid dynamic bearing assembly included in the spindle motor has increased.

However, in the case in which the lubricating fluid is pumped by the thrust dynamic pressure groove and the radial dynamic pressure groove as described above, areas of negative pressure (that is, pressure lower than atmospheric pressure) may be generated.

In addition, since rotational characteristics may be deteriorated in the case in which negative pressure is generated, the development of a structure capable of reducing the generation of negative pressure has been required.

In the following Related Art Document, a spindle motor including a thrust plate is disclosed.

RELATED ART DOCUMENT

Japanese Patent Laid-Open Publication No. 2004-84864

SUMMARY OF THE INVENTION

An aspect of the present invention provides a spindle motor capable of reducing a generation of negative pressure.

Another aspect of the present invention provides a spindle motor capable of reducing abrasion of a thrust plate.

According to an aspect of the present invention, there is provided a spindle motor including: a sleeve fixedly installed on a base member; a shaft rotatably supported by the sleeve; a rotor hub fixedly installed on an upper end portion of the shaft to rotate together therewith; and a thrust plate fixedly coupled to the sleeve so as to be disposed to face a lower surface of the rotor hub and having a ring shape, wherein the thrust plate includes a channel part formed therein in order to reduce a difference in pressure between a bearing clearance on an inner side thereof and a bearing clearance on an outer side thereof.

The channel part may be configured of grooves formed in a lower surface of the thrust plate and an inner peripheral surface thereof.

The thrust plate may be formed by a sintering process in order to reduce abrasion.

The sleeve may include a circulation hole formed therein in order to connect a bearing clearance at a lower end portion of the sleeve and a bearing clearance at an upper end portion of the sleeve to each other.

At least one of an upper surface of the thrust plate and the lower surface of the rotor hub may be provided with a thrust dynamic pressure groove.

At least one of an inner surface of the sleeve and an outer surface of the shaft may be provided with upper and lower radial dynamic pressure grooves, and the upper radial dynamic pressure groove may pump a lubricating fluid downwardly in an axial direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
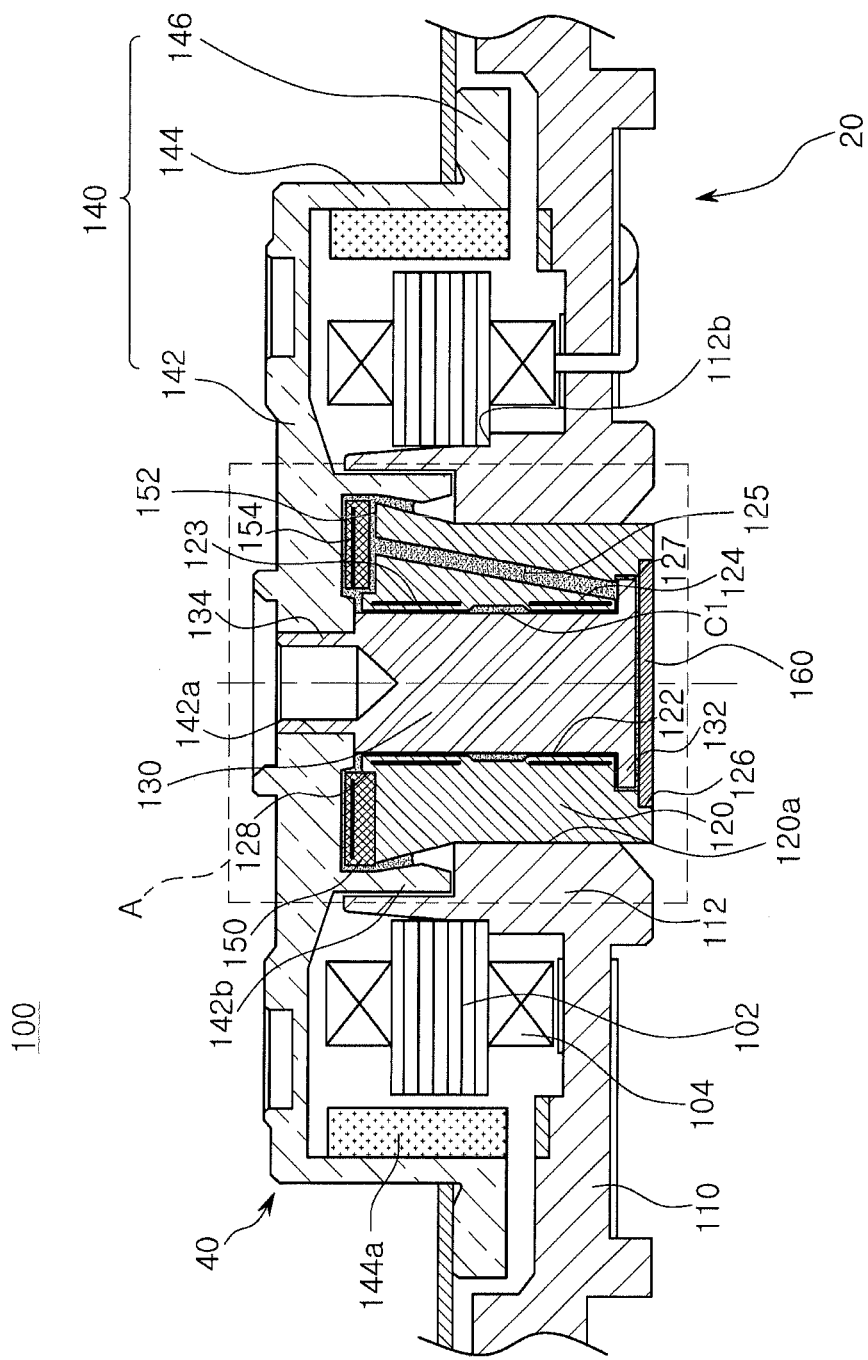
FIG. 1 is a schematic cross-sectional view showing a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
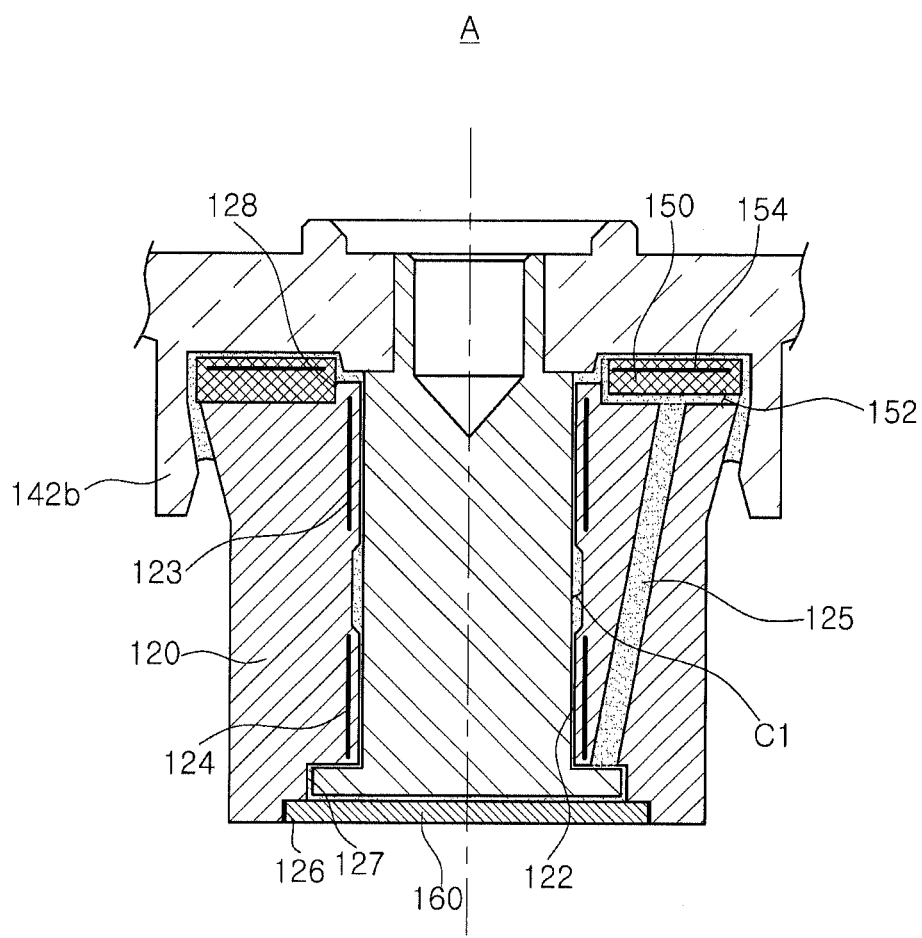
FIG. 2 is an enlarged view of part A of FIG. 1.

FIG. 1 is a schematic cross-sectional view showing a spindle motor according to an embodiment of the present invention; FIG. 2 is an enlarged view of part A of FIG. 1; and FIG. 3 is a lower perspective view showing a thrust plate included in the spindle motor according to the embodiment of the present invention.

Figure 3:
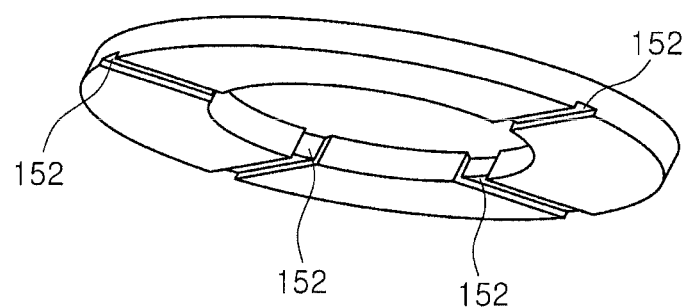
FIG. 3 is a lower perspective view showing a thrust plate included in the spindle motor according to the embodiment of the present invention.

Referring to FIGS. 1 through 3, a spindle motor 100 according to an embodiment of the present invention may include, for example, a base member 110, a sleeve 120, a shaft 130, a rotor hub 140, a thrust plate 150, and a cover member 160.

The spindle motor 100 may be a motor used in a recording disk driving device driving a recoding disk.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, and a radial direction refers to a horizontal direction, that is, a direction from an outer peripheral surface of the rotor hub 140 toward the shaft 130 or from the shaft 130 toward the outer peripheral surface of the rotor hub 140.

In addition, a circumferential direction refers to a rotation direction along an outer peripheral direction of the rotor hub 140 or the shaft 130.

The base member 110, a fixed member, may configure a stator 20. Here, the stator 20, all fixed members except for a rotating member, may include the base member 110, the sleeve 120, and the like.

In addition, the base member 110 may include an installation part 112 having the sleeve 120 insertedly installed therein. The installation part 112 may protrude upwardly in the axial direction and include an installation hole 112a formed therein so that the sleeve 120 may be insertedly installed therein.

In addition, the installation part 112 may include a seat surface 112b formed on an outer peripheral surface thereof so that a stator core 104 with a coil 102 wound therearound may be seated thereon. That is, the stator core 104 may be fixedly installed on the outer peripheral surface of the installation part 112 by an adhesive in a state in which it is seated on the seat surface 112b.

However, the stator core 104 may also be installed on the outer peripheral surface of the installation part 112 in a press-fitting scheme without using the adhesive. That is, a scheme of installing the stator core 104 is not limited to a scheme by the adhesive.

The sleeve 120, a fixed member configuring the stator 20 together with the base member 110, may rotatably support the shaft 130 and form a bearing clearance C1 filled with a lubricating fluid.

Meanwhile, the sleeve 120 may be inserted into and fixedly installed to the installation part 112 of the base member 110. That is, an outer peripheral surface of the sleeve 120 may be adhered to an inner peripheral surface of the installation part 112 by an adhesive.

In addition, the sleeve 120 may include a shaft hole 122 formed therein, wherein the shaft hole 122 has the shaft 130 inserted thereinto. Further, in the case in which the shaft 130 is inserted into the shaft hole 122 of the sleeve 120, an inner peripheral surface of the sleeve 120 and the outer peripheral surface of the shaft 130 may be spaced apart from each other by a predetermined interval to form the bearing clearance C1 therebetween.

Here, the bearing clearance C1 will be described in more detail. As described above, the sleeve 120 may form the bearing clearance C1 filled with the lubricating fluid. This bearing clearance C1 may indicate a clearance formed by the shaft 130 and the sleeve 120, a clearance formed by the thrust plate 150 and the rotor hub 140, a clearance formed by the sleeve 120 and the rotor hub 140, and a clearance formed by the cover member 160 and a lower surface of the shaft 130.

In addition, the spindle motor 100 according to the present embodiment may have a structure in which the lubricating fluid is provided in the entire bearing clearance C1. This structure may be called a full-fill structure.

Meanwhile, the sleeve 120 may include upper and lower radial dynamic pressure grooves 123 and 124 formed in the inner peripheral surface thereof in order to generate fluid dynamic pressure at the time of the rotational driving of the shaft 130. In addition, the upper and lower radial dynamic pressure grooves 123 and 124 may be disposed to be spaced apart from each other by a predetermined interval and have a herringbone or spiral shape.

However, the upper and lower radial dynamic pressure grooves 123 and 124 are not limited to being formed in the inner peripheral surface of the sleeve 120, but may be formed in the outer peripheral surface of the shaft 130.

In addition, at the time of the rotational driving of the shaft 130, the lubricating fluid may move from the upper radial dynamic pressure groove 123 toward the lower radial dynamic pressure groove 124. That is, as a result, the spindle motor 100 according to the present embodiment may have a down-pumping structure.

In addition, the sleeve 120 may include a circulation hole 125 formed therein in order to connect the bearing clearance C1 at an upper end portion of the sleeve 120 and the bearing clearance C1 at a lower end portion thereof.

A detailed description of the circulation hole 125 will be provided below.

Meanwhile, the sleeve 120 may include a mounting groove 126 formed in the lower end portion thereof so that the cover member 160 may be installed thereon. Further, the sleeve 120 may include a depression groove 127 depressed upwardly from the mounting groove 126 in the axial direction.

In addition, the sleeve 120 may include a mounting part 128 formed on an upper surface thereof so that the thrust plate 150 may be installed thereon.

The shaft 130, a rotating member, may configure a rotor 40. Here, the rotor 40 refers to a member rotatably supported by the stator 20 to thereby rotate.

Meanwhile, the shaft 130 may be rotatably supported by the sleeve 120. In addition, a lower end portion of the shaft 130 may be provided with a flange part 132 inserted into the depression groove 127.

The flange part 132 may serve to prevent the shaft 130 from being separated from the sleeve 120 upwardly and prevent the shaft 130 from being excessively floated. That is, at the time of rotational driving of the shaft 130, the shaft may be floated at a predetermined interval, and in this case, the flange part 132 may prevent the shaft 130 from being excessively floated. In addition, the flange part 132 may serve to prevent the shaft 130 from being separated of the sleeve 120 upwardly due to an external impact.

Further, the shaft 130 may include a coupling part 134 formed at an upper end portion thereof so that the rotor hub 140 can be coupled thereto. The coupling part 134 may have a diameter smaller than that of the lower portion of the shaft 130.

Further, in the case in which the shaft 130 is mounted in the sleeve 120, the coupling part 134 may be disposed to protrude upwardly of the sleeve 120.

The rotor hub 140, a rotating member configuring the rotor 40 together with the shaft 130, may be fixedly installed on the upper end portion of the shaft 130 and rotate together with the shaft 130.

Meanwhile, the rotor hub 140 may include a rotor hub body 142 provided with an mounting hole 142a into which the coupling part 134 of the shaft 130 is inserted, a magnet mounting part 144 extended downwardly from an edge of the rotor hub body 142 in the axial direction, and a disk seating part 146 extended outwardly from a distal end of the magnet mounting part 144 in the radial direction.

In addition, the magnet mounting part 144 may have a driving magnet 144a installed on an inner surface thereof, wherein the driving magnet 144a is disposed to face a front end of the stator core 104 having the coil 102 wound therearound.

Meanwhile, the driving magnet 144a may have an annular ring shape and may be a permanent magnet generating magnetic force having a predetermined amount of strength by alternately magnetizing an N pole and an S pole thereof in a circumferential direction.

Here, rotational driving of the rotor hub 140 will be briefly described. When power is supplied to the coil 102 wound around the stator core 104, driving force capable of rotating the rotor hub 140 is generated by electromagnetic interaction between the driving magnet 144a and the stator core 104 having the coil 102 wound therearound.

Therefore, the rotor hub 140 may rotate. In addition, the shaft 130 to which the rotor hub 140 is fixedly installed may rotate together with the rotor hub 140 by the rotation of the rotor hub 140.

Meanwhile, the rotor hub body 142 may include an extension wall part 142b extended downwardly in the axial direction so as to form an interface between the lubricating fluid and air, that is, a liquid-vapor interface, together with the outer peripheral surface of the sleeve 120.

An inner surface of the extension wall part 142b is disposed to face the outer peripheral surface of the sleeve 120, and at least one of the inner surface of the extension wall part 142b and the outer peripheral surface of the sleeve 120 may be inclined so as to form the liquid-vapor interface.

That is, at least one of the outer peripheral surface of the sleeve 120 and the inner surface of the extension wall part 142b may be inclined so that the liquid-vapor interface may be formed by a capillary phenomenon.

Meanwhile, in the case in which both of the inner surface of the extension wall part 142b and the outer peripheral surface of the sleeve 120 are inclined, two angles of inclination may be different from each other.

The thrust plate 150, a fixed member configuring the stator 20 together with the sleeve 120, may be fixedly coupled to the sleeve 120 so as to be disposed to face a lower surface of the rotor hub 140 and may have a ring shape.

That is, the thrust plate 150 may be mounted on the mounting part 128 of the sleeve 120 and have an annular ring shape.

Further, the thrust plate 150 may include a channel part 152 in order to reduce a difference in pressure at an inner side and an outer side. That is, in the case in which the thrust plate 150 is mounted on the sleeve 120, the channel part 152 for reducing a difference in pressure between the bearing clearance C1 on the inner side of the thrust plate 150 in the radial direction and the bearing clearance C1 on the outer side of the thrust plate 150 in the radial direction may be provided in the thrust plate 150.

The channel part 152 may be configured of grooves formed in a lower surface of the thrust plate 150 and an inner peripheral surface thereof.

Meanwhile, an upper surface of the thrust plate 150 may be provided with a thrust dynamic pressure groove 154 in order to support the rotor hub 140 at the time of rotation of the rotor hub 140. In addition, the thrust dynamic pressure groove 154 may have a herringbone shape, and the lubricating fluid may be pumped toward a central portion of the thrust dynamic pressure groove 154.

In other words, the lubricating fluid provided in the bearing clearance C1 formed by the upper surface of the thrust plate 150 and the lower surface of the rotor hub 140 may be pumped toward the central portion of the thrust dynamic pressure groove 154.

Meanwhile, the lubricating fluid provided in the bearing clearance C1 on the inner side of the thrust plate 150 may be pumped by the upper radial dynamic pressure groove 123 and the thrust dynamic pressure groove 154.

However, since the thrust plate 150 includes the channel part 152 formed therein, generation of negative pressure in the bearing clearance C1 on the inner side of the thrust plate 150 may be reduced. In other words, pressure in the bearing clearance C1 on the inner side and the outer side of the thrust plate 150 may be maintained to be equal to atmospheric pressure by the channel part 152.

That is, in the case in which the channel part 152 is not provided, pressure in the bearing clearance C1 on the inner side of the thrust plate 150 may be reduced to the negative pressure (pressure lower than atmospheric pressure). However, according to the embodiment of the present invention, since the channel part 152 is provided in the thrust plate 150, suppressed phenomenon in which pressure in the bearing clearance C1 on the inner side of the thrust plate 150 is reduced to be negative pressure may be suppressed.

Therefore, rotational characteristics of the rotor 40 may be improved.

In addition, although the case in which the thrust dynamic pressure groove 154 is formed in the upper surface of the thrust plate 150 is described by way of example in the present embodiment, the present invention is not limited thereto. That is, the thrust dynamic pressure groove 154 may be formed in the lower surface of the rotor hub 140.

Further, a shape of the thrust dynamic pressure groove 154 is not limited to the herringbone shape, but may have any shape as long as the thrust dynamic pressure groove 154 may provide floating force and pump the lubricating fluid from the inner side of the thrust plate 150 to the outer side thereof.

Meanwhile, although the case in which four channel parts 152 are formed is shown by way of example in FIG. 3, the present invention is not limited thereto, but one, two, three, or four or more channel parts 152 may be formed.

That is, the number of the channel parts 152 is not limited.

In addition, the thrust plate 150 may be formed by a sintering process. Further, in the case in which the thrust plate 150 is formed by the sintering process, abrasion-resistance properties of the thrust plate 150 may be improved.

That is, the lower surface of the rotor hub 140 may contact the thrust plate 150 when rotation of the rotor 40 is stopped, and the thrust plate 150 may be abraded by friction between the lower surface of the rotor hub 140 and the thrust plate 150 at the time of rotation of the rotor 140.

However, since the thrust plate 150 is formed by the sintering process and formed of an abrasion resistant material, the abrasion-resistance properties of the thrust plate 150 may be improved.

Meanwhile, here, the circulation hole 125 of the sleeve 120 is described. The circulation hole 125 may be formed so as to connect the bearing clearance C1 formed by an upper surface of the flange part 132 of the shaft 130 and the sleeve 120 to the channel part 152 of the thrust plate 150.

In addition, the circulation holes 125 may be inclined at a predetermined angle.

The cover member 160, a fixed member configuring the stator 20 together with the base member 110 and the sleeve 120 described above, may be installed in the lower end portion of the sleeve 120 to thereby serve to prevent the lubricating fluid provided in the bearing clearance C1 from being leaked to the lower end portion of the sleeve 120.

Meanwhile, the cover member 160 may be bonded to the mounting groove 126 of the sleeve 120 by an adhesive and/or welding.

As described above, generation of the negative pressure in the bearing clearance C1 on the inner side of the thrust plate 150 may be reduced by the channel part 152.

Further, abrasion-resistance properties of the thrust plate 150 may be improved by the thrust plate 150 formed by the sintering process.

Hereinafter, a spindle motor according to another embodiment of the present invention will be described with reference to the accompanying drawings. However, a detailed description of the same components as the above-mentioned components will be omitted and be replaced by the above-mentioned description.

Figure 4:
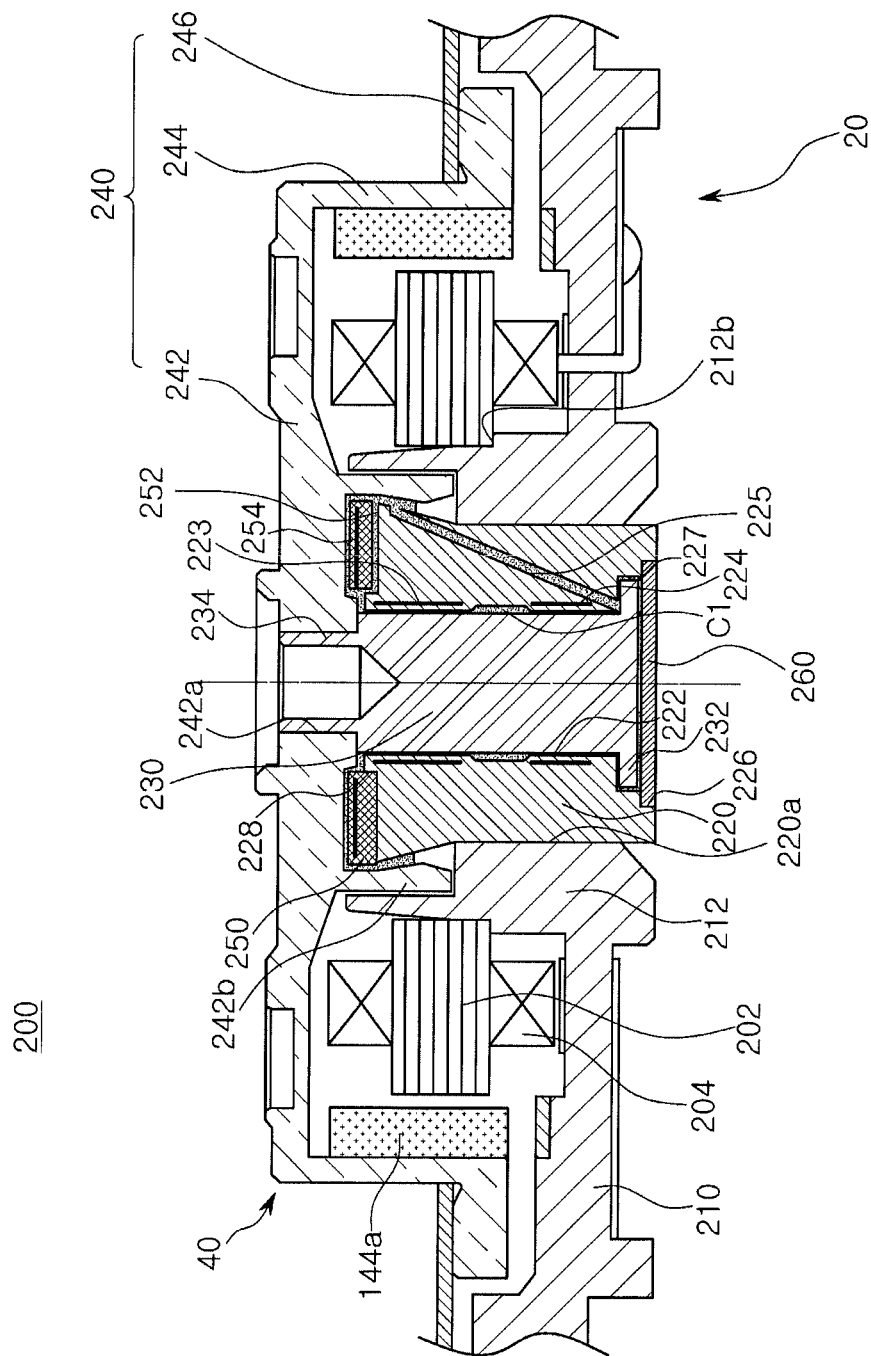
FIG. 4 is a schematic cross-sectional view showing a spindle motor according to another embodiment of the present invention.

FIG. 4 is a schematic cross-sectional view showing a spindle motor according to another embodiment of the present invention.

Referring to FIG. 4, a spindle motor 200 according to another embodiment of the present invention may include a base member 210, a sleeve 220, a shaft 230, a rotor hub 240, a thrust plate 250, and a cover member 260, by way of example.

Meanwhile, since the spindle motor 200 according to another embodiment of the present invention has the same components as those of the spindle motor 100 according to the embodiment of the present invention described above except for a circulation hole 225 of the sleeve 220, only a description of the circulation hole 225 will be provided below.

The circulation hole 225 may be formed so as to connect a bearing clearance C1 formed by an upper surface of the flange part 232 of the shaft 230 and the sleeve 220 and the bearing clearance C1 formed by an extension wall part 242b and the sleeve 220 to each other. To this end, the circulation hole 225 may be inclined.

In addition, the spindle motor 200 according to another embodiment of the present invention may implement the same effects as those implemented by the spindle motor 100 according to the embodiment of the present invention described above.

As set forth above, according to embodiments of the present invention, the generation of the negative pressure in the bearing clearance on the inner side of the thrust plate may be reduced by the channel part.

In addition, abrasion of the thrust plate may be reduced by the thrust plate formed by the sintering process.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a sleeve fixedly installed on a base member;
   a shaft rotatably supported by the sleeve;
   a rotor hub fixedly installed on an upper end portion of the shaft to rotate together therewith; and
   a thrust plate fixedly coupled to the sleeve so as to be disposed to face a lower surface of the rotor hub and having a ring shape,
   wherein the thrust plate includes a channel part formed therein in order to reduce a difference in pressure between a bearing clearance on an inner side thereof and a bearing clearance on an outer side thereof, and
   the channel part is configured of grooves formed in a lower surface of the thrust plate and an inner peripheral surface thereof.

2. The spindle motor of claim 1, wherein the thrust plate is formed by a sintering process in order to reduce abrasion.

3. The spindle motor of claim 1, wherein the sleeve includes a circulation hole formed therein in order to connect a bearing clearance at a lower end portion of the sleeve and a bearing clearance at an upper end portion of the sleeve to each other.

4. The spindle motor of claim 1, wherein at least one of an upper surface of the thrust plate and the lower surface of the rotor hub is provided with a thrust dynamic pressure groove.

5. The spindle motor of claim 1, wherein at least one of an inner surface of the sleeve and an outer surface of the shaft is provided with upper and lower radial dynamic pressure grooves, and
   the upper radial dynamic pressure groove pumps a lubricating fluid downwardly in an axial direction.

\* \* \* \* \*